Patented Apr. 3, 1951

2,547,733

UNITED STATES PATENT OFFICE 2,547,733

PARTIALLY CURED RUBBERLIKE CEMENT

Francis P. Baldwin, Rahway, N. J., assignor to Standard Oil Development Company, a corporation of Delaware No Drawing. Application December 28, 1945, Serial No. 637,775

5 Claims. (Cl. 260—33.6)

The invention relates to cementing materials, relates particularly to cements prepared from the low temperature interpolymer of isobutylene with multi-olefin; and relates especially to cements prepared by dissolving in a solvent, a portion of the synthetic copolymer which has been treated with a small amount of curing agent before dissolving.

An exceedingly valuable polymer has been prepared from a mixture of a major proportion of an isoolefin such as isobutylene with a minor proportion of multi-olefin such as butadiene or isoprene or the like; which has been found to be satisfactory for the making of rubber-like articles generally, including automobile inner tubes, proofed goods and the like. However, considerable difficulty has been encountered in preparing a cement from this copolymer. The polymer, if used simply from the solution without curing, has a relatively low strength which for many purposes is inadequate. It has been suggested that the cement be made up with a curing agent in it and that it be subsequently cured after the assembly of the component parts. This, however, involves the difficulty and danger of over-curing the respective component parts. Cements from other materials such as caoutchouc, the butadiene type polymers and the like are made adherent only with great difficulty to this polymer.

According to the present invention, it is now found that if a portion of the isobutylene-diolefin polymer in the solid form is treated, preferably on the mill or in the Banbury mixer, with limited amounts of curing agent such as p-dinitroso benzene or the like, it is possible to combine with the polymer a small, limited amount of the curing agent under conditions which leave the mixture soluble in the ordinary solvents to yield an excellent cement which works well either as a brushing cement or a finger cement, keeps well, yet when dry produces an excellent bond of good strength and high durability.

Accordingly, the invention provides a cement from an isobutylene-diolefin low temperature interpolymer in which a portion of the polymer is treated with a limited amount of curing agent insufficient to insolubilize the polymer yet sufficient in amount to increase the tensile strength and modulus of the cement when in a joint between other articles. Other objectives and details of the invention will be apparent from the following description.

The raw material of this invention is the low temperature interpolymer of an isoolefin such as isobutylene with diolefin such as isoprene, as shown in U. S. Patents #2,356,127–8, both issued August 22, 1944, to Thomas and Sparks.

As shown in these patents, the polymer is prepared from an olefinic mixture consisting of a major proportion of an isoolefin, which is preferably isobutylene, and a minor proportion of multi-olefin having from 4 to 14 carbon atoms per molecule. The preferred multi-olefins are such substances as butadiene, isoprene, piperylene, dimethyl-butadiene, dimethallyl, myrcene, allo-ocimene and the like.

The preferred range of proportion for these mixtures is from 70 parts to 99 parts of the isoolefin with from 30 parts to 1 part of the multi-olefin. The mixture may also contain a diluent or diluent-refrigerant such as any of the low-boiling hydrocarbons, including liquid ethylene, liquid ethane, liquid propane, liquid butane, light naphtha and the like, or alternately any of the mono or poly halogen substituted olefinic compounds having up to about 6 carbon atoms and freezing points above the polymerization temperature may also be used as diluents.

The olefinic mixture is then cooled to a temperature below about $-40°$ C., preferably within the range between $-70°$ C. and $-103°$ C., although in some instances temperatures as low as $-164°$ C. (the boiling point of liquid methane) may be used. The cooled mixture may be chilled by a refrigerating jacket containing any refrigerant which will give the desired low temperature. Alternatively the cooling may be obtained by an internal refrigerant added directly to the olefinic mixture. For this purpose such substances as liquid ethylene, liquid ethane, liquid or solid $CO_2$ and occasionally, liquid propane, are particularly suitable. In some instances, these substances serve both as refrigerants and as diluents.

The polymerization is obtained by the application to the cooled mixture of a Friedel-Crafts catalyst in solution in low-freezing non-complex-forming solvent. The preferred catalyst substance is aluminum chloride, but any of the Friedel-Crafts substances disclosed by N. O. Calloway in his article on "The Friedel-Crafts Synthesis" printed in the issue of "Chemical Reviews" published for the American Chemical Society at Baltimore in 1935, in volume XVII, No. 3, the article beginning on page 327, the list being particularly well shown on page 375, may be used.

For the solvent, the preferred solvents are the lighter mono and poly halogen substituted olefinic compounds including such substances as ethyl or methyl chloride, ethylene dichloride, or any aliphatic substance containing one or more halogen substituents and having a freezing point not more than 10° above the polymerization temperature. Particularly useful are the fluorene substituted compounds and the fluoro chlorides, some of which have carbon atom numbers as high as 12 to 15 and freezing points low enough to be useful in this reaction. The solvent need show no more than the capacity of dissolving 0.5% of the Friedel-Crafts salt to be useful in this polymerization reaction. With other of the Friedel-Crafts compounds, including aluminum chloro bromide, aluminum chloro eth-oxide, titanium tetrachloride, boron trifluoride and the lower hydrocarbons are particularly satisfactory as catalyst solvents. All of these substances are defined as low freezing, thereby meaning characterized by freezing point below 0° C.; and as non-complex-forming, meaning thereby that the solvent can be evaporated away from the solute with no more than 1 or 2 degrees of temperature rise above the boiling point of the pure solvent, to leave a residue of the salt substantially free from solvent.

The catalyst is applied to the rapidly stirred cooled olefinic material in any convenient way as in the form of a fine spray applied to the surface of the rapidly stirred cooled liquid or in the form of a fine jet delivered under substantial pressure into the body of the cooled, rapidly stirred olefinic material.

The reaction proceeds promptly to yield the desired solid polymer which preferably has a Staudinger molecular weight number within the range between about 35,000 and about 90,000 (materials having a Staudinger number of less than about 20,000 do not cure, and materials having a Staudinger number above about 90,000 are undesirably hard to mill). The material likewise shows an iodine number (by the Wijs method) below 50, and preferably within the range between 1 and 10. The polymer is reactive with such substances as sulfur, especially in the presence of a curing aid, or paraquinone dioxime or the p-dinitroso compounds to yield a product having a tensile strength ranging from 1800 to 3600 pounds, and an elongation at break ranging between 500% and 1200%.

The polymer may be recovered from the reaction mixture by discharging the whole mixture into warm water to volatilize out the excess refrigerant, the diluent and the residual unpolymerized olefins; and to wash out a portion of the spent catalyst. Alternatively, the polymerized mixture may be discharged into warm naphtha to dissolve the polymer, to volatilize out the low-boiling components and permit the removal of all of the spent catalyst by washing the solution. The solid polymer may then be separated by volatilizing out the solvent or by precipitation with an alcohol such as ethyl or propyl or butyl alcohol.

The resulting polymer may be dried on the double roll mill. For the making of inner tubes and the like the polymer is conveniently compounded according to the following formula:

|  | Parts |
|---|---|
| Polymer | 100 |
| Zinc oxide | 5 |
| Stearic acid | 5 |
| Sulfur | 3 |
| Tetramethyl thiuram disulfide | 1 |
| Filler | 0-200 |

(Tuads—Tetra methyl thiuram disulfide)

For the purposes of the present invention, a portion of the raw polymer is placed on the cold mill, and a limited amount of a curing agent, which is preferably a p-dinitroso compound such as p-dinitroso benzene or p-dinitroso cymene or p-dinitroso naphthalene or the like, added. The polymer is worked on the cold mill until the curing agent is well worked into yield a homogeneous dispersion. Milling is then continued at a temperature preferably at or above 300° F. The treated polymer is then dissolved in a suitable solvent such as light naphtha or benzol or the like to yield the desired cement. The amount of solvent may be adjusted to produce either a brushing cement or a finger cement as desired.

For some purposes, the amount of curing agent added is preferably within the range between 0.05% and 0.1%, whereas for other purposes, the amount may be increased to 0.6%.

The concentration of solids in the cement may be varied over a wide range according to the requirements of the articles being cemented. However, a concentration of about 65 to 70% solids in the cement is about the top limit, since higher concentrations are too thick to spread. The lower limit is in the neighborhood of about 10% since solutions containing less than 10% of solids are too thin to yield a satisfactory coating for most purposes. The structures which are to be cemented are then prepared for cementing in the usual way by cleaning, roughening and wiping with a solvent and are then treated with polymer cement as above prepared. The joint is held together and the solvent allowed to evaporate to yield a cemented joint of excellent quality.

According to the present invention, the amount of curing agent incorporated into the polymer is kept below a quantity sufficient to insolubilize the polymer and it is a primary prerequisite of the present invention that the polymer is not "cured" to render it insoluble, nor to develop in it an elastic limit nor a definite elongation at break. Instead, the quantity of curing agent and the nature of the chemical combination are kept such as to maintain in the polymer its solubility in an adequate solvent.

The exact nature of this chemical reaction between the polymer and the limited quantity of curing agent is not known but it may be that it is due to forces of association, or adsorption or some analogous interplay which is responsible for the change in physical characteristics of the solutions, without substantial change in the chemical characteristics of the treated polymer.

It may be noted that the preferred curing agent for the present invention is a dinitroso compound. The upper limit of the amount of the pure dinitroso curing agent depends to some extent upon the molecular weight of the curing agent and the unsaturation of the polymer, but with most of the curing agents which are available, especially most of the dinitroso compounds, the upper limit of curing agent is approximately 0.5%, although occasionally the upper limit is as high as 0.9% (by weight on the total weight of polymer). The minimum limit is still uncertain, and depends to a considerable extent both upon the unsaturation, the molecular weight and character of the curing agent and the characteristics desired in the polymer. In most instances, the minimum amount is 0.1% of pure curing agent, although occasionally amounts as small as 0.05% yield substantial advantages according to the present invention.

The preferred curing agent is a dinitroso compound because of its very high reactivity. Alternatively, however, the various quinone dioximes and their esters and metal salts may also be used. They require however a more careful handling and a more extended heat treatment to combine the agent into the polymer. Also various of the thiuram compounds may be used for the same purpose, including such substances as tetra methyl thiuram disulfide, tetra methyl thiuram mono sulfide and the analogous substances. These, however, are relatively more expensive and somewhat less satisfactory, since the heat treatment required is harder to apply and the quantity required is usually substantially larger than with the other substances.

The method of practicing the invention is well shown in the following examples, which are presented as exemplifications, and not as imposing any limitations upon the invention.

EXAMPLE 1

A polymer was prepared as above outlined using approximately 97.5% of isobutylene of 98% purity and approximately 2.5% of isoprene of 96% purity. The polymer was plasticized by the use of a hydrocarbon plasticizer to improve its ease of processing, the plasticizer being mixed in on a cold mill and then the polymer placed in a Banbury mixer for 15 minutes at 300° F. This mixture was the base compound for a series of tests using varying amounts of plasticizer and varying amounts of curing agent in each plasticized sample. The curing agent used was a mixture of 25% p-dinitroso benzene with 75% of inert clay, this mixture being added to the various samples of softened polymer in the proportion of 0.2%, 0.4% and 0.6%. The curing agent was mixed into the sample polymer on a cold mill and steam was then turned into the rolls and the mixture was milled for 10 minutes at 300° F. Mooney viscosity determinations were made on the softened polymer and on the p-dinitroso treated polymer, and the solubility properties of the mixture were determined.

The results are shown in the following table:

Table I
EFFECT OF MOLECULAR WEIGHT ON p-DINITROSO BENZENE TOLERANCE

| Base Polymer [1] | Mooney Viscosity | Dinitroso-Clay Mixture Added [2] | Mooney Viscosity | Solution Properties [3] |
|---|---|---|---|---|
| Polymer I+.20 Plasticizer | 67 | 0.0 | 67 | Soluble. |
|  |  | 0.20 | 98 | Do. |
|  |  | 0.40 | 112 | Do. |
|  |  | 0.60 | 126 | Very slight gel. |
| Polymer I+.25 Plasticizer | 61 | 0.0 | 61 | Soluble. |
|  |  | 0.20 | 90 | Do. |
|  |  | 0.40 | 107 | Do. |
|  |  | 0.60 | 125 | Very slight gel. |
| Polymer I+.30 Plasticizer | 60 | 0.0 | 60 | Soluble. |
|  |  | 0.20 | 95 | Do. |
|  |  | 0.40 | 106 | Do. |
|  |  | 0.60 | 112 | Very slight gel. |
| Polymer I+.35 Plasticizer | 54 | 0.0 | 54 | Soluble. |
|  |  | 0.20 | 78 | Do. |
|  |  | 0.40 | 93 | Do. |
|  |  | 0.60 | 104 | Very slight gel. |
| Polymer I+.40 Plasticizer | 55 | 0.0 | 55 | Soluble. |
|  |  | 0.20 | 76 | Do. |
|  |  | 0.40 | 91 | Do. |
|  |  | 0.60 | 105 | Very slight gel. |
| Polymer I+.45 Plasticizer | 52 | 0.0 | 52 | Soluble. |
|  |  | 0.20 | 67 | Do. |
|  |  | 0.40 | 84 | Do. |
|  |  | 0.60 |  | Very slight gel. |
| Polymer I+.50 Plasticizer |  | 0.0 | 53 | Soluble. |
|  |  | 0.20 | 75 | Do. |
|  |  | 0.40 | 91 | Do. |
|  |  | 0.60 | 114 | Very slight gel. |
| Polymer I+.55 Plasticizer | 49 | 0.0 | 49 | Soluble. |
|  |  | 0.20 | 68 | Do. |
|  |  | 0.40 | 77 | Do. |
|  |  | 0.60 | 95 | Very slight gel. |

[1] Plasticizer mixed in a cold mill, then banburied 15′/300° F.
[2] 25% p-dinitroso benzene-75% clay, mixed in a cold mill, then milled for 10′ at 300° F.
[3] 10% solids solution in 56 naphtha.
Each of these cements were tested for workability and joint strength, and all were found to give excellent cementing action and joints of adequate strength.

It may be noted that all of these tests were run on portions of a single sample of polymer having a Staudinger molecular weight of about 50,000 and a Mooney viscosity number of about 62. The mol per cent unsaturation was approximately 0.8%. The mol per cent unsaturation is defined as the percentage of diolefin molecules, each of which brings into the polymer one unit of unsaturation, in the copolymer, the balance being isobutylene molecules; as shown in the article under the title "Determination of Unsaturation in Rubber," by John Rehner, Jr. and Priscilla Gray, published in the "Analytical Edition—Industrial and Engineering Chemistry," volume 17, No. 6, pages 367 to 370, June 1945.

EXAMPLE 2

A similar series of tests to those in Example 1 were made using several different grades of polymer having different mol per cent unsaturation, as obtained by the polymerization of mixtures of isobutylene containing from 1.5 to 4% of isoprene. The various specimens of polymer were softened as in Example 1 and mixed with varying proportions of the p-dinitroso benzene-clay mixture. Solubility determinations were then made on the treated polymer to yield the results shown in Table II:

ment on the edges of a shoe tongue, then folding the edges over to form an ⅛ inch fold along both

Table II
EFFECT OF UNSATURATION ON p-DINITROSO BENZENE TOLERANCES

| Unsaturation by Ozonolysis | | | | | | | |
|---|---|---|---|---|---|---|---|
| 0.3<br>0.7 | polymer (B—1.5)<br>polymer (B—2.0)<br>Curing Agent [1]<br>Solution Properties [2] | 100.0<br>0.4<br>Soluble | 100.0<br>0.6<br>Very Slight Gel | 100.0<br>0.8<br>Slight Gel | 100.0<br>0.4<br>Soluble | 100.0<br>0.6<br>Very Slight Gel | 100.0<br>0.8<br>Slight Gel |
| 0.8<br>0.9 | polymer (B—2.5)<br>polymer (B—3.0)<br>Curing Agent [1]<br>Solution Properties [2] | 100.0<br>0.4<br>Soluble | 100.0<br>0.6<br>Very Slight Gel | 100.0<br>0.8<br>Slight Gel | 100.0<br>0.4<br>Soluble | 100.0<br>0.6<br>Soluble | 100.0<br>0.8<br>Very Slight Gel |
| 1.1 | polymer (B—4.0)<br>Curing Agent [1]<br>Solution Properties [2] | 100.0<br>0.4<br>Soluble | 100.0<br>0.6<br>Soluble | 100.0<br>0.8<br>Very Slight Gel | | | |

[1] Curing agent was a mixture of 25% dinitroso benzene and 75% clay, and was mixed in on coldmills, then milled 10′ @ 300° F.
[2] 10% Solids solution in 56 naphtha.

In this table, B—1.5 indicates a polymer of isobutylene and isoprene containing 1.5% molecular unsaturation; B—2.0, 2% molecular unsaturation; B—2.5, 2.5% molecular unsaturation; B—3.0, 3% molecular unsaturation; and B—4.0, 4% unsaturation. The percent unsaturation corresponds relatively closely to the percent of isoprene copolymerized into the polymer.

The results indicated in Table I show that the effect of molecular weight and Mooney viscosity is of minor consequence in the preparation of cements according to the present invention, whereas, from Table II, the unsaturation, that is the amount of copolymerized diolefins is of substantial importance in the preparation of the polymer, larger amounts of curing agent being usable with the higher amounts of interpolymerized diolefins.

EXAMPLE 3

The polymer cement of the present invention is particularly suitable as a shoe cement which is preferably a non-curing gum cement, used to hold shoe soles in place, to hold folds on shoe tongues in place or to hold together other parts of a shoe until they can be stitched. The following example shows the efficacy of the present cement for this purpose.

Two separate compounds were prepared, one being simply a copolymer of isobutylene and isoprene containing approximately 2.5% of isoprene and having a Mooney viscosity of 70. With the polymer, in both mixtures there was combined approximately 20% (on the weight of polymer) of Amberol St-137X resin which is a phenol-formaldehyde type resin having a specific gravity of about 1.04 and a melting point of 65–90° C.; and with the second mixture there was included 0.4% of curing agent in the form of a mixture of 25% dinitroso benzene and 75% clay. The recipes are shown in the following Table III:

Table III

| | 1 | 2 |
|---|---|---|
| Polymer B—2.5 (70 Mooney) | 100.0 | 100.0 |
| Cure Agent (resin) | 20.0 | 0.4 |
| | | 20.0 |

In compound 2 the curing agent (25% p-dinitroso benzene–75% clay) was mixed in on a cold mill and then transferred to a hot mill (300° F.) and mixed for 5 minutes to effect complete reaction.

The test consisted of brushing 2 coats of the cement on the edges of a shoe tongue, then folding the edges over to form an ⅛ inch fold along both edges of the tongue. The object was to determine if the cement would hold this fold firmly and not allow any lifting. The observations are shown below:

Compound #1 (control)—lifted immediately
Compound #2 (experimental)—had not lifted after 5 days, at which time test was discontinued.

EXAMPLE 4

Cements of the type of those provided by the present invention are commonly used on fabric and proofed goods in the form of finger cements which are placed by the operator's fingers. They are particularly useful in the assembly and make-up of proofed fabric such as raincoats, storm suits, slickers and similar waterproof articles.

One of the primary requirements of a finger cement is a "clean break," that is, when the operator lifts up a finger full of the cement from the container, the cement should break clean from the supply in the container and leave a compact "dab" or "bolus" or "gob" which does not string out into threads. In addition, the cement must yield a strong bond after application.

A portion of copolymer of isobutylene with 2.5% isoprene having a Mooney viscosity of 70 was made up in two batches according to a recipe in which the curing agent was, as in the previous examples, a mixture of 25% dinitroso benzene and 75% clay. These compounds were milled on a cool mill to obtain a good dispersion, and compound 4 was thereafter milled for 10 minutes at 300° F. to complete the chemical combination. These cements were then made up in a 65% by weight concentration in 56° naphtha in a churn.

The test run consisted of applying with the finger two coats of the cement (5 minute drying time between coats) to a one inch wide strip of 3 ounce 4 yard cotton sheeting. The strip was then doubled over and tested to yield the following inspection record:

| Conditioning of Strip | Adhesion (lb./in. pulled @ 20″/min.) | |
|---|---|---|
| | 1 | 2 |
| | Lb. | Lb. |
| 4 hours rest (uncured) | 2 | 2.5 |
| 1 day | | 8 |
| 2 days | 5 | |
| 3 days | | 10 |
| 4 days | 6 | |
| 6 days | | 11 |
| Cured 1½ hrs. @ 270° F | 8 | 12 |

In addition, the control cement was difficult to apply since it did not break clean and resulted in long strings stretching from the finger to the cement container, whereas the experimental compound containing the curing agent broke sharply and cleanly with no sign of troublesome stringiness.

The recipe should contain substantial quantities of sulfur, substantial quantities of tetra methyl thiuram disulfide and substantial quantities of selenium di-ethyl di-thio carbamate; which are suitable for curing the polymer by an appropriate heat treatment. The initial heat treatment to combine into the polymer the small portion of dinitroso benzene is insufficient to cause reaction with the sulfur or the sulfurization aids, and accordingly the resulting polymer forms a high-grade cement solution, which can be further cured by heat treatment at temperatures ranging from 307° F. to 370° F. for time intervals within the range between 10 or 15 minutes and several hours, depending upon the article, the temperature and similar variables.

In the assembly of proofed goods, the fabric with the applied polymer is cut to shape, and if desired, given a set cure or partial cure, then assembled with the present cement and the assembled article given a final and complete cure to cure both the proofing polymer coating and the cementing polymer.

Thus the process of the invention prepares a high tensile strength cement for an isoolefin-diolefin interpolymer by the steps of compounding into the polymer an amount of curing agent insufficient to destroy the solubility of the polymer in light naphtha, thereafter dissolving the polymer to form a cement, applying it and drying it to yield a high tensile strength cemented joint.

While there are above disclosed but a limited number of embodiments of the process and product of the invention, it is possible to provide still other embodiments without departing from the inventive concept herein disclosed and it is therefore desired that only such limitations be imposed on the appended claims, as are stated therein or required by the prior art.

The invention claimed is:

1. A cement comprising a solution in light hydrocarbon solvent of a polymer of a major proportion of isobutylene with a minor proportion of isoprene in a concentration within the range between 15% and 70% together with from 0.05% to 0.1% of dinitroso benzene the said polymer comprising a synthetic solid plastic hydrocarbon interpolymer of a major proportion of isobutylene with a minor proportion of a conjugated diolefin having 4 to 8 inclusive carbon atoms per molecule, the polymer being characterized by a low unsaturation below an iodine number of 50, a molecular weight above 15,000 and reactivity with sulfur to yield an elastic product.

2. A cement comprising a light hydrocarbon solution of an isoolefin-diolefin interpolymer of a major proportion of isobutylene with a minor proportion of a conjugated diolefin having 4 to 8 carbon atoms per molecule, the polymer being characterized by a low unsaturation below an iodine number of 50, a molecular weight above 15,000 and reactivity with sulfur to yield an elastic product, said interpolymer having combined thereinto before solution an amount between .05% and 0.5% by weight of a dinitroso aromatic hydrocarbon in an amount sufficient to partially cure said interpolymer but in an amount insufficient to destroy the solubility thereof in the light hydrocarbon solution.

3. A cement comprising a light naphtha solution of an interpolymer of 70 to 99 parts by weight of isobutylene with from 1 to 30 parts by weight of isoprene, having a Staudinger molecular weight of 20,000 to 90,000, and an iodine number, by the Wijs method, of 1 to 10, said interpolymer having combined thereinto before solution an amount between .05% and 0.5% by weight of paradinitrosobenzene sufficient to partially cure said interpolymer but insufficient to destroy its solubility in said light naphtha.

4. A method of preparing a high tensile strength cement comprising the steps in combination of combining .05% to 0.5% by weight of a dinitroso aromatic hydrocarbon into an isoolefin-diolefin interpolymer of 70 to 99% by weight of isobutylene with 1 to 30% by weight of a conjugated diolefin having 4 to 8 carbon atoms per molecule, said interpolymer having a low unsaturation, an iodine number of 50, a molecular weight of 20,000 to 90,000, and reactivity with sulfur to yield an elastic product, the amount of said dinitroso compound used being sufficient to partially cure said interpolymer but insufficient to destroy its solubility in light hydrocarbon solvents, and thereafter dissolving said partially cured interpolymer in a light hydrocarbon solvent in a concentration within the range of 15% to 70%.

5. In a method of preparing a high tensile strength cement, the steps of cold mixing .05% to 0.5% by weight of p-dinitrosobenzene into an interpolymer of 70 to 99% by weight of isobutylene with 1 to 30% by weight of isoprene, said interpolymer having a Staudinger molecular weight of 20,000 to 90,000, an iodine number of 1 to 10 and reactivity with sulfur to yield an elastic product, the amount of said dinitrosobenzene used being sufficient to partially cure said interpolymer but insufficient to destroy its solubility in a light naphtha, then hot milling the interpolymer-dinitrosobenzene mixture at a temperature of about 300° F. for 5 to 15 minutes to partially cure said interpolymer, and thereafter dissolving the partially cured interpolymer in a light naphtha in a concentration within the range of 15% to 70%.

FRANCIS P. BALDWIN.

REFERENCES CITED

The following references are of record in the file of this patent:

UNITED STATES PATENTS

| Number | Name | Date |
| --- | --- | --- |
| 2,403,964 | Bannon | July 16, 1946 |
| 2,442,218 | Sparks | May 25, 1948 |
| 2,446,927 | Hineline | Aug. 10, 1948 |
| 2,457,331 | Trepagnier | Dec. 28, 1948 |

FOREIGN PATENTS

| Number | Country | Date |
| --- | --- | --- |
| 513,521 | Great Britain | Oct. 16, 1939 |

OTHER REFERENCES

Rehner; Ind. and Eng. Chem., Feb. 1944, pages 118–123.